(12) United States Patent
Reinhardt et al.

(10) Patent No.: US 6,894,620 B2
(45) Date of Patent: May 17, 2005

(54) METHOD AND DEVICE FOR MONITORING THE SERVICE LIFE OF A FILTER

(75) Inventors: Heinz Reinhardt, Edingen (DE); Richard Borris, Heppenheim (DE); Christoph Malig, Weinheim (DE)

(73) Assignee: Carl Freudenberg KG, Weinheim (DE)

( * ) Notice: Subject to any disclaimer, the term of this patent is extended or adjusted under 35 U.S.C. 154(b) by 0 days.

(21) Appl. No.: 10/215,587

(22) Filed: Aug. 9, 2002

(65) Prior Publication Data

US 2003/0052791 A1 Mar. 20, 2003

(30) Foreign Application Priority Data

Aug. 17, 2001 (DE) ........................................ 101 40 510

(51) Int. Cl.$^7$ ............................................. G08B 21/00
(52) U.S. Cl. ........................ 340/607; 340/606; 340/608
(58) Field of Search ............................... 340/607, 606, 340/608, 611; 55/215, 274, 309.1, 385.3; 96/417, 418, 419; 95/23, 25

(56) References Cited

U.S. PATENT DOCUMENTS

| | | | | |
|---|---|---|---|---|
| 5,036,698 A | * | 8/1991 | Conti | ............................ 73/38 |
| 5,205,156 A | * | 4/1993 | Asano et al. | ................... 73/38 |
| 5,604,306 A | * | 2/1997 | Schricker | .................... 73/118.2 |
| 5,606,311 A | * | 2/1997 | Polidan et al. | .............. 340/607 |
| 5,681,988 A | * | 10/1997 | Koch et al. | ................ 73/118.1 |
| 6,107,923 A | * | 8/2000 | Christol | ....................... 340/607 |
| 6,172,602 B1 | * | 1/2001 | Hasfjord | ..................... 340/438 |
| 6,582,295 B1 | * | 6/2003 | Abouchaar | ................... 454/158 |

FOREIGN PATENT DOCUMENTS

| | | |
|---|---|---|
| DE | 41 01 739 | 7/1991 |
| DE | 41 37 520 | 5/1992 |
| EP | 0 847 787 | 6/1998 |

* cited by examiner

Primary Examiner—Toan N. Pham
(74) Attorney, Agent, or Firm—Kenyon & Kenyon

(57) ABSTRACT

A method of monitoring the service life of a filter (1) in a filter system equipped with a fan, in particular a filter (1) in an air conditioning system of a motor vehicle, the instantaneous air speed (21) preferably being measured on each startup of the system using a sensor (2, 20) downstream from the filter (1), compared to the reference air speed (R) from the unloaded filter (1), and transmitted to a service computer and/or indicated on a display, and the need to replace the filter being signaled when this value falls below a predetermined threshold or threshold range of the instantaneous air flow rate (21).

17 Claims, 5 Drawing Sheets

METHOD AND DEVICE FOR MONITORING THE SERVICE LIFE OF A FILTER

BACKGROUND OF THE INVENTION

1. Field of the Invention

The invention relates to the problem of monitoring the service life of filters.

2. Description of Related Art

Because of the limited fan power of many filter systems, particularly for filters used in air conditioning systems in motor vehicles, a drop in the volumetric flow rate occurs as dust accumulates on the filter. Therefore, it is desirable to be able to measure the degree of blockage of the filter in these systems in order to replace the filter in a timely manner.

A device for detecting the degree of blockage in a dust filter is known from German Patent Application 41 37 520 A1. Here, at least two sensors are situated in the air duct, each corresponding to different sections of the dust filter and sending electrical signals which indicate the air speed in the respective areas of the air duct. The difference in the air speed, which is measured by the sensors and compared in a potentiometer, shows the given degree of contamination in the dust filter. In order to obtain reliable results, various devices are installed in the flow channel to which sensors are associated to make a comparison with sensors installed at other locations. The device is thus sensitive and relatively costly to manufacture, and therefore is suitable only for larger filter systems. In addition, the sensor situated upstream from the filter may become contaminated.

Another possibility for monitoring the degree of contamination of a filter situated in an air stream is described in German Patent Application 41 01 739 A1. Here, a bypass line is provided parallel to the path of the air flow which bypasses the filter and in which a sensor in the form of a measuring sensor is situated which is responsive to changes in the flow speed and which actuates a display signal to a display device when a specific flow speed is exceeded. This device is also relatively costly, and, likewise, is therefore only practical for larger systems. The sensor is impinged on by unfiltered air and thus is not protected from contamination.

One air filtering option having a simple design and also being usable in air conditioning systems in motor vehicles is described in European Patent Application 0 847 787 A1. The filter used here is overlaid with a network of electrical conductors, the electrical resistance of the conductors being measured when air flows through the filter. The electrical resistance provides a measure of the flow rate. From this information, conclusions may be drawn as to the degree of blockage. The manufacturing costs are high, and assembly is resource-intensive.

SUMMARY OF THE INVENTION

It is the object of the invention to provide monitoring of the service life of a filter which has a simple design and which allows a reliable statement to be made with respect to the degree of blockage. It is a further object of the invention to provide a method and a device by which it is possible to measure the blockage of a dust filter in a filter system, in particular a dust filter in a heating and air conditioning system of a motor vehicle.

These and other objects of the invention are achieved by a method of monitoring the service life of a filter (1) in a filter system equipped with a fan, in particular a filter (1) in an air conditioning system of a motor vehicle, the instantaneous air speed (21) preferably being measured on each startup of the system using a sensor (2, 20) downstream from the filter (1), compared to the reference air speed (R) from the unloaded filter (1), and transmitted to a service computer and/or indicated on a display, and the need to replace the filter being signaled when this value falls below a predetermined threshold or threshold range of the instantaneous air flow rate (21).

BRIEF DESCRIPTION OF THE DRAWINGS

The present invention will be described in greater detail with reference to the following drawings wherein.

DETAILED DESCRIPTION OF THE INVENTION

Figure 1:
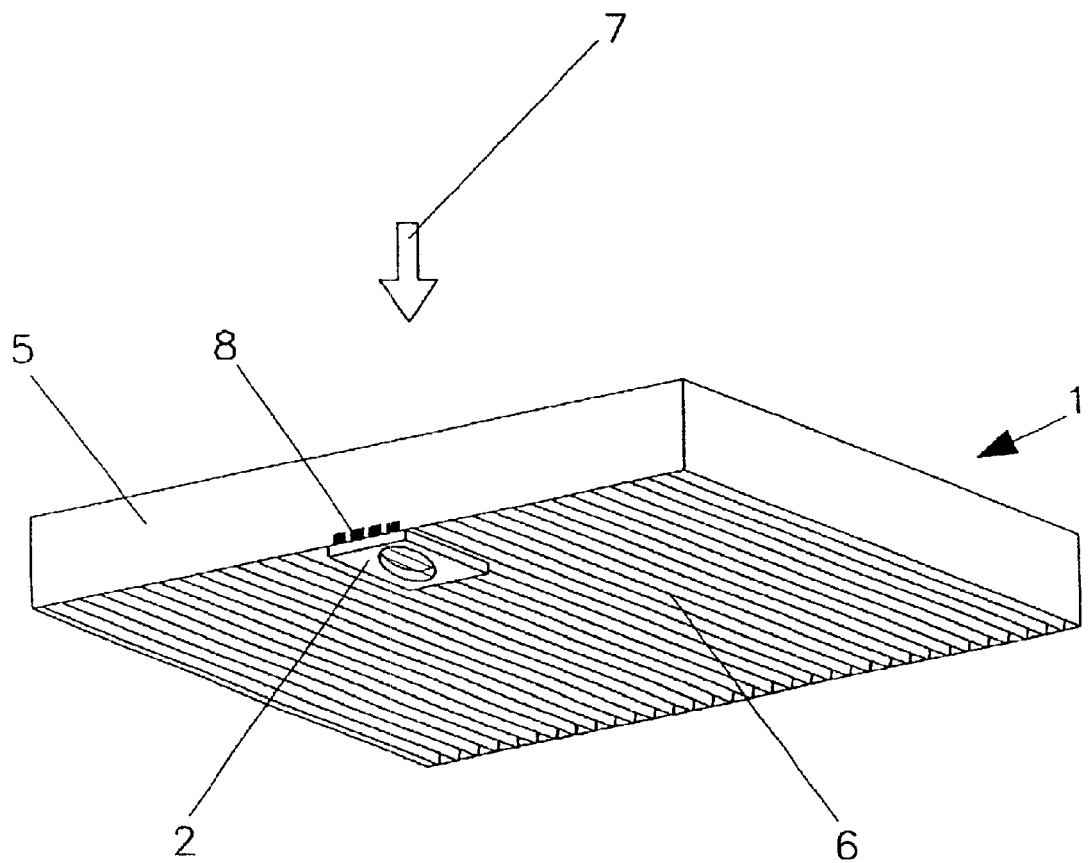
FIG. 1 shows the arrangement of a filter having a sensor in the flow channel.

In accordance with the invention, the instantaneous air speed is measured downstream from the filter preferably on each startup, compared to the reference air speed from the unloaded filter, and transmitted to a service computer and/or indicated on a display. The need to replace the filter is signaled when this value falls below a predetermined threshold or threshold range of the instantaneous air speed. The volumetric flow of the air is measured each time a new filter is installed in the system, and in this manner the reference air speed is determined. To this end, the electrical voltage at the fan for the filter system is set at a predetermined fixed value, and the air flow rate is measured. No further measurements are made during operation. Preferably, the instantaneous air speed is not measured again until after a new startup following a shutdown, and this instantaneous air speed is compared to the reference air speed of the unloaded new dust filter and stored in a vehicle service computer or indicated on a display. The degree of blockage of the dust filter may be read from the display. As soon as the degree of contamination reaches a predetermined threshold, in that the instantaneous air speed has dropped to a threshold, a signal is generated to the effect that the filter should be replaced.

The invention also provides a method of monitoring the service life of a filter, having a filter system equipped with a fan, in particular a filter in a heating and air conditioning system of a motor vehicle, the instantaneous air speed being measured by a sensor downstream from the filter and compared to the difference relative to a reference air speed from the unloaded filter, and transmitted to a service computer and/or indicated on a display, the need to replace the filter being signaled when this value falls below a predetermined difference from a threshold or threshold range. The difference relative to the reference air speed is measured for two predetermined electrical voltages across the fan for the filter system. It is advantageous in such a method if it is possible to check the degree of contamination of the filter during operation as well.

To this end, the sensor may be connected to a warning light and/or an acoustic warning signal, for example. In addition, it is advantageous, in particular in motor vehicles, if it is possible to connect the sensor to a diagnostic system of a motor vehicle repair facility so that the degree of blockage may be read. The sensor is designed in such a way that its signals are emitted as a function of the air speed present at the sensor.

Instead of a measurement on each startup of the filter system, cyclic measurement may also be carried out, as a function of the operating periods of the system or the milage of the motor vehicle, for example.

The device for carrying out the method of the present invention is characterized in that downstream from the filter a sensor is situated which measures the air flow of the air stream passing through the filter, the sensor transmitting the drop in the air speed to a service computer and/or to a display as a function of the load state of the filter. The sensor may be attached to the filter itself. In this case, it is necessary to provide the filter holder with corresponding intake contacts and to provide the filter itself with connector contacts which are connected via lines to the sensor attached to the filter. Another advantageous option is to attach the sensor or sensors to the holding frame which accommodates the replaceable filter. In this case, the filters may have a design that is unchanged from previous designs, and may be inserted in the corresponding holding frame or housing for the filter. This is recommended when the sensor is not a replaceable item.

FIG. 1 shows in a perspective illustration a rectangular filter 1 having a filter frame 5 which contains a fabric filter 6 folded in a zigzag shape. Arrow 7 indicates the direction of the air flow during operation of the filter system. Downstream from dust filter 1, sensor 2 is mounted which measures the air speed of the air flowing through filter 1. Electrical contacts 8 are mounted on filter frame 5 which connect with electrical contacts mounted on a filter housing 9 when filter 1 is inserted into the filter housing. Via lines which are not shown in further detail, a connection is created to a service computer or to an optical display on which the data from sensor 2 are displayed and read. Such a design for filter 1 having sensor 2 attached directly to the filter may be used when sensor 2 is economically manufacturable.

Figure 2:
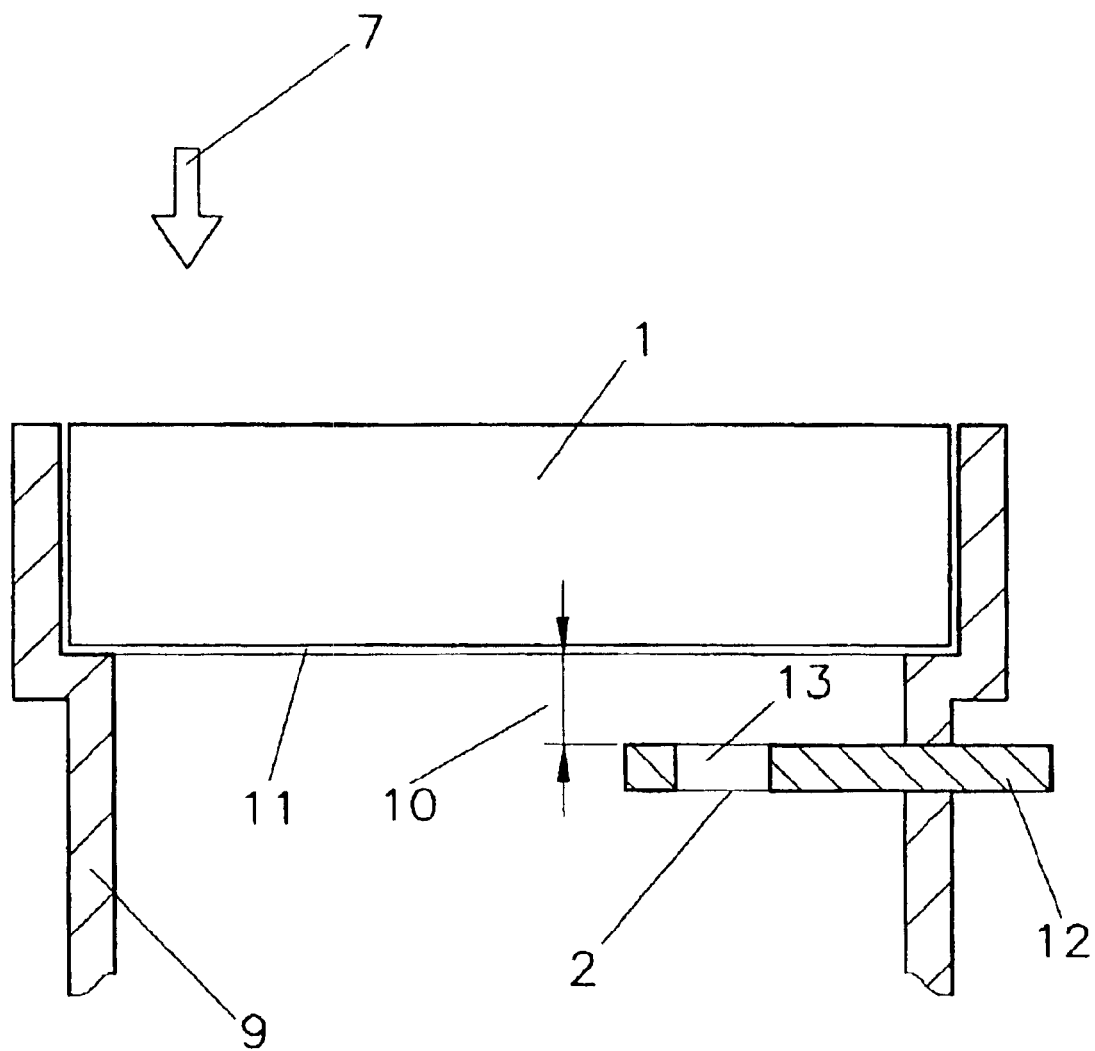
FIG. 2 shows the arrangement of a filter in the flow channel having a sensor on the holding frame for the filter.

Another possibility is shown in FIG. 2, in which sensor 2 is mounted in housing 9 downstream from and below filter 1. In this case, sensor 2 remains installed in housing 9 and only filter 1 is replaced when a blockage threshold is reached. In commonly marketed filters the distance 10 of sensor 2 from lower edge 11 of filter 1 is chosen to be within an order of magnitude of 1 mm to 20 mm. Good measurement of the air flow rate is achieved by this relatively close arrangement of sensor 2 to lower edge 11 of filter 1. Sensor 2 which is used for this purpose has a very simple design and has a plate 12 containing a round opening 13 in the flow path. Appropriate measuring wires are mounted in opening 13 by which the air flow rate is measured. Lines are connected to plate 12 by which the measured signals are transmitted to the display (not shown).

Figure 3:
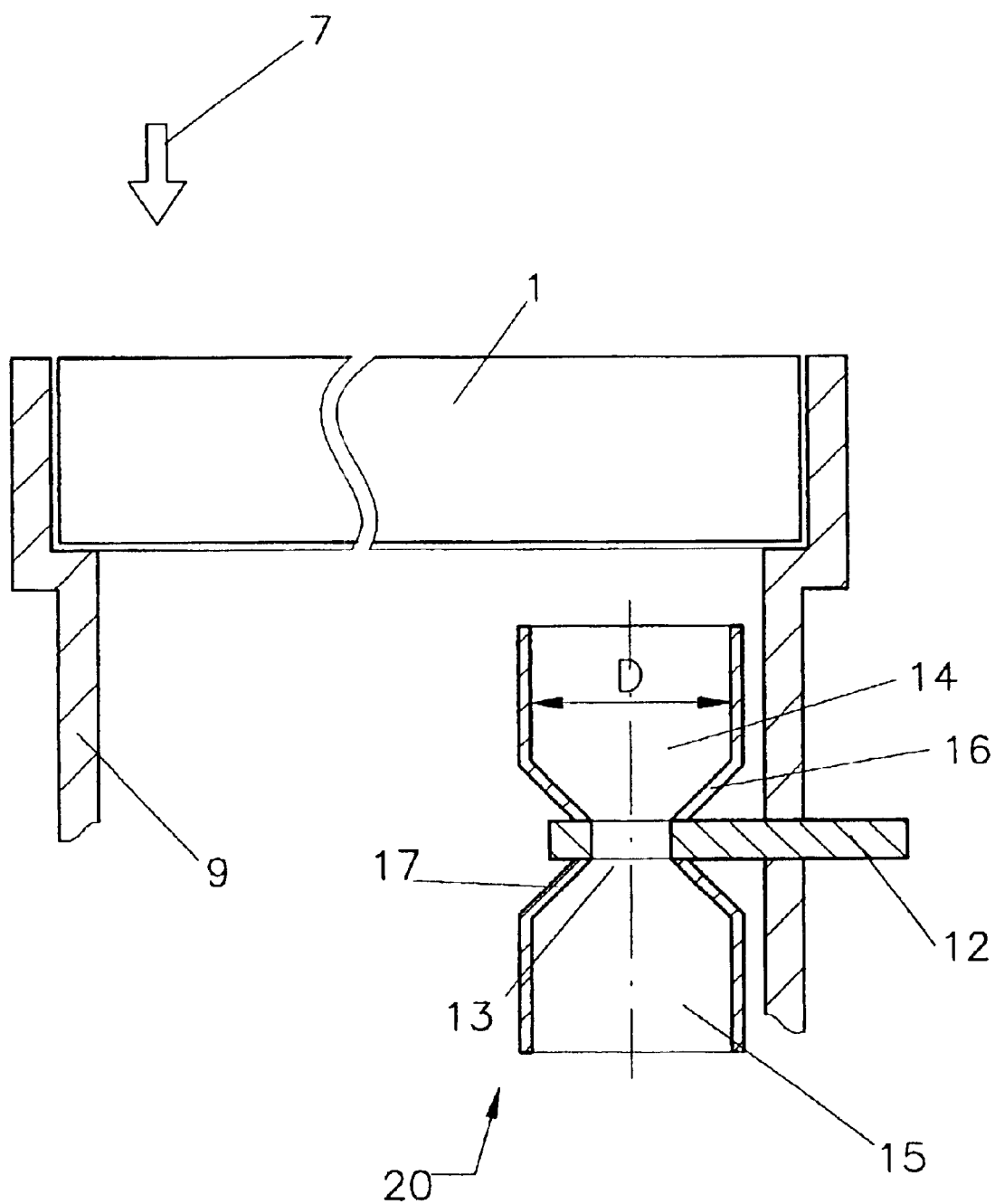
FIG. 3 shows another design of a sensor attached to the holding frame.

FIG. 3 shows another design of a sensor 20 in which, in addition to plate 12, an inflow tube 14 and an outflow tube 15 are installed. Diameter D of tubes 14 and 15 is the same. Both tubes 14 and 15 are provided with conically designed insert pieces 16 and 17, respectively, facing toward opening 13. Such a sensor 20 allows the air flow rate to be conducted, and thus precisely measured, very satisfactorily.

Figure 4:
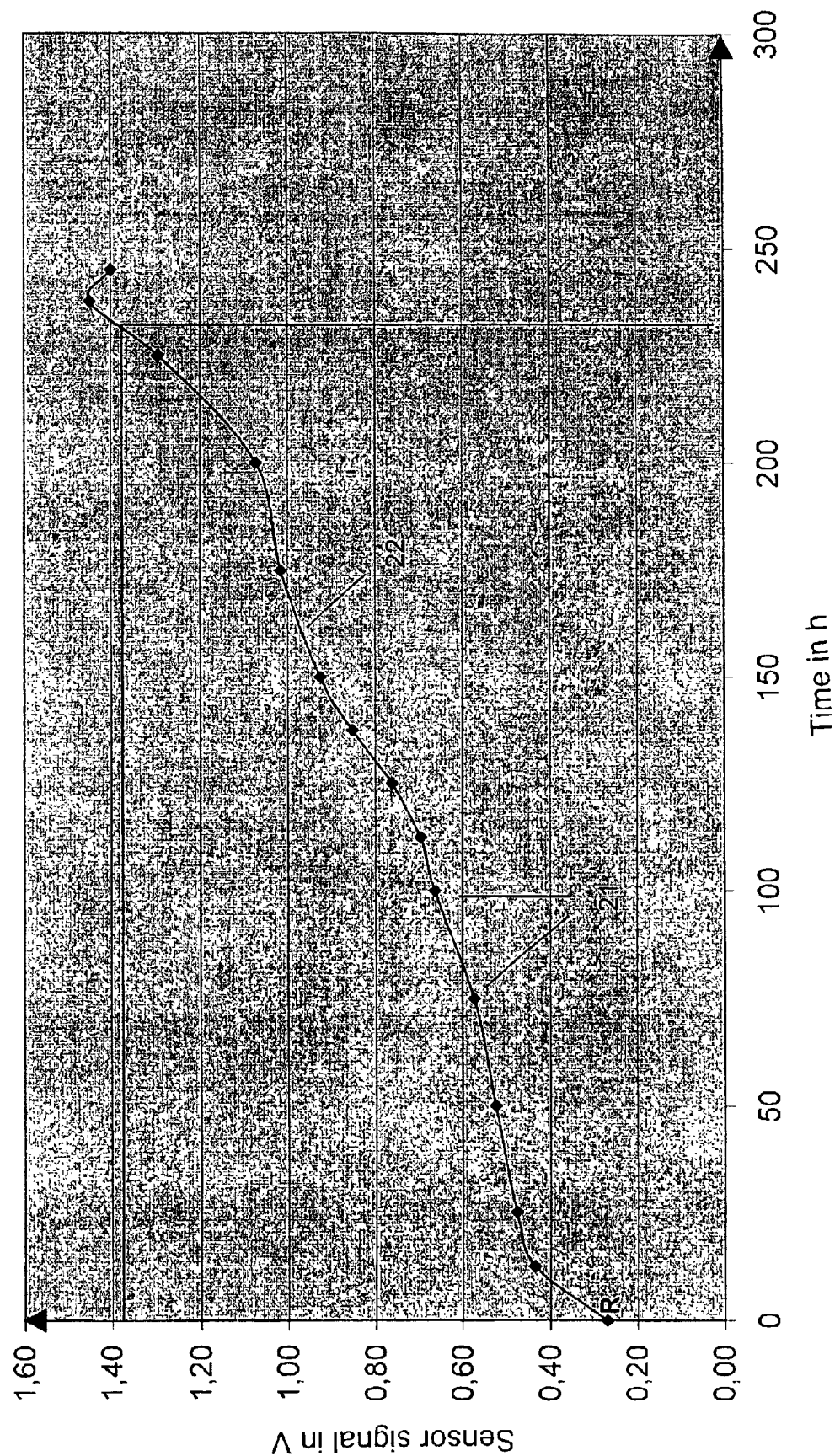
FIG. 4 shows a diagram of the course of filter blockage as a function of the sensor voltage and the time, using a method according to the invention.

FIG. 4 shows measured values determined as voltage values plotted as a function of time, in hours. When a new filter is installed in the filter system, reference air speed R is measured at time 0:0. An electrical voltage of 4 V is established at the fan for the filter system. In the present example, the voltage measured by the sensor was approximately 0.29 V. The volumetric flow was approximately 300 $m^3/hr$. The pressure difference of this new filter, measured at a reference volumetric flow of 180 $m^3/hr$, was approximately 30 Pascal. With increasing use, the volumetric flow decreases and the sensor signal increases. Measurement points 21 result in curve 22, which shows the degree of blockage for each new startup of the system. At approximately 235 hours the volumetric flow rate had reached a value of 125 $m^3/hr$, and the sensor signal had a value of 1.39 volt. The pressure difference of the filter, measured at 180 $m^3/hr$, was now approximately 167 Pascal. The filter was then exhausted and had to be replaced.

Figure 5:
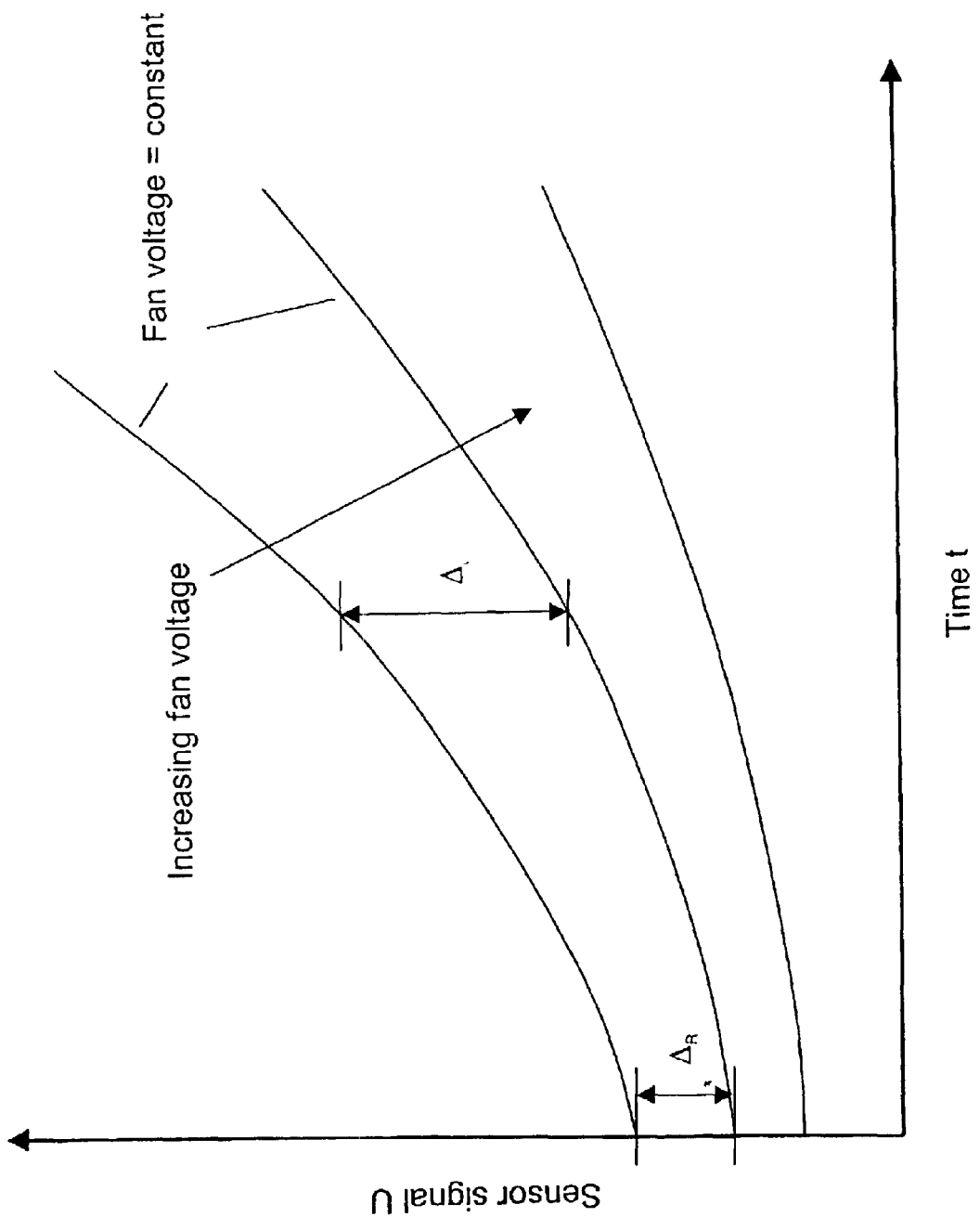
FIG. 5 shows a diagram of the course of filter blockage as a function of the sensor voltage and the time, corresponding to a method according to the invention.

FIG. 5 shows measured values determined as voltage values plotted as a function of time. The instantaneous air speed was determined and compared to the difference from reference air speed R of unloaded filter 1. The need to replace the filter is signaled when this value drops below a predetermined difference from a threshold or threshold range. The difference relative to reference air speed R is measured for two predetermined electrical voltages at the fan for the filter system. It is advantageous that it is possible to easily check the load state of the filter during operation.

What is claimed is:

1. A method of monitoring the service life of a filter (1) in a filter system equipped with a fan, comprising: measuring the instantaneous air speed (21) using a sensor (2, 20) downstream from the filter (1), comparing it to the reference air speed (R) from the unloaded filter (1) and transmitting it to a service computer or indicating it on a display, wherein the need to replace the filter is signaled when this value drops below a predetermined threshold or threshold range of the instantaneous air speed (21), wherein the reference air speed for the filter system is determined during every new filter installation, the reference air speed calculated from a volumetric flow of air in the system.

2. The method according to claim 1, wherein the instantaneous air speed is measured on each startup of the system.

3. The system according to claim 2, wherein the reference air speed (R) is measured at a predetermined electrical voltage across the fan for the filter system.

4. The method according to claim 1, wherein the reference air speed (R) is measured at a predetermined electrical voltage across the fan for the filter system.

5. The method according to claim 1, wherein the sensor (2, 20) is connected to a warning light.

6. The method according to claim 1, wherein the sensor (2, 20) is connected to an acoustic warning signal.

7. The method according to claim 1, wherein it is possible to connect the sensor (2, 20) to the service computer of the motor vehicle or to the diagnostic system of a motor vehicle repair facility.

8. The method according to claim 1, wherein the sensor (2, 20) generates signals as a function of the electrical voltage across the sensor (2, 20).

9. A method of monitoring the service life of a filter (1) in a filter system equipped with a fan, comprising: measuring the difference in the instantaneous air speed (21) using a sensor (2, 20) downstream from the filter (1), comparing this difference to a reference air speed from the unloaded filter (1), and transmitting it to a service computer or indicating it on a display, wherein the need to replace the filter is signaled when this value drops below a predetermined difference from a threshold or threshold range, wherein the reference air speed for the filter system is determined during every new filter installation, the reference air speed calculated from a volumetric flow of air in the system.

10. The method according to claim 9, wherein the difference in the reference air speed (R) is measured for two predetermined electrical voltages across the fan for the filter system.

11. The method according to claim 9, wherein the sensor (2, 20) is connected to a warning light.

12. The method according to claim 9, wherein the sensor (2, 20) is connected to an acoustic warning signal.

13. The method according to claim 9, wherein it is possible to connect the sensor (2, 20) to the service computer or the motor vehicle or to the diagnostic system of a motor vehicle repair facility.

14. The method according to claim 9, wherein the sensor (2, 20) generates signals as a function of the electrical voltage across the sensor (2, 20).

15. A device for monitoring the service life of a filter (1), comprising a sensor (2, 20) situated downstream from the filter (1), which measures the air speed of the air flow led through the filter (1), and transmits a drop in the air speed to a service computer or to a display as a function of the load state of the filter (1), wherein the device is configured to determine a reference air speed for the filter system during every new filter installation, the reference air speed calculated from a volumetric flow of air in the system.

16. The device according to claim 15, wherein the sensor (2) is attached to the filter (1).

17. The device according to claim 15, wherein the sensor (2, 20) is attached to a housing (9) which accommodates the replaceable filter (1).

* * * * *

UNITED STATES PATENT AND TRADEMARK OFFICE
CERTIFICATE OF CORRECTION

PATENT NO. : 6,894,620 B2
DATED : May 17, 2005
INVENTOR(S) : Heinz Reinhardt et al.

It is certified that error appears in the above-identified patent and that said Letters Patent is hereby corrected as shown below:

Column 5,
Line 15, change "or the motor vehicle" to -- of the motor vehicle --.

Signed and Sealed this

Fifteenth Day of November, 2005

JON W. DUDAS
*Director of the United States Patent and Trademark Office*